United States Patent Office 3,071,599
Patented Jan. 1, 1963

3,071,599
PREPARATION OF HYDROXYMETHYL
FURFURAL
Ralph A. Hales, West Chester, Pa., John W. Le Maistre, Claymont, Del., and George Otto Orth, Jr., Seattle, Wash., assignors to Atlas Chemical Industries, Inc., Wilmington, Del., a corporation of Delaware
No Drawing. Filed Feb. 25, 1959, Ser. No. 795,363
8 Claims. (Cl. 260—347.8)

This invention relates to the preparation of hydroxymethyl furfural and more particularly to an improvement in the process of preparing hydroxymethyl furfural by the dehydration of hexoses.

That hydroxymethyl furfural is one of the products formed when hexoses are subjected to dehydrating conditions is well known in the chemical art and it has been proposed repeatedly to utilize this dehydration reaction in a commercially practical manner for the production of hydroxymethyl furfural. Reference is made, for example, to U.S. Patent No. 2,750,394 wherein the kinetics of the reaction are extensively considered and a process for carrying out the dehydration of keto hexoses in the presence of aqueous solutions of lower aliphatic monohydric alcohols is disclosed and claimed. Acids and acid generating salts are known to be useful catalysts for the dehydration reaction.

It is an object of the present invention to provide an improved process for converting hexoses to hydroxymethyl furfural.

Another object is to provide a process for converting hexoses to hydroxymethyl furfural by catalytic dehydration in reaction media of low water content.

A further object is to provide a process for dehydrating hexoses to hydroxymethyl furfural while avoiding the formation and deposition of insoluble humins.

The above and other objects will become more apparent in the course of the following description of the invention and in the appended claims.

In accordance with the invention, a hexose is converted to hydroxymethyl furfural by acid-catalyzed dehydration in a reaction medium comprising water and an organic liquid containing ketone or ether oxygen. More particularly the organic liquid is selected from the group consisting of acid-stable aliphatic ketones and acid-stable aliphatic ethers of normal boiling point no greater than about 280° C.

The process of the invention is applicable to the conversion of both keto- and aldo-hexoses. Moreover, since the dehydration reaction is acid-catalyzed and conducted at an elevated temperature, disaccharides and oligosaccharides which readily hydrolyze to ketoses, aldoses or mixture of the two under such conditions, may be employed as starting materials. Suitable sugars for conversion thus include glucose, fructose, sorbose, mannose, sucrose and maltose. There may also be employed mixtures rich in sugars, particularly for example, molasses, either high test or blackstrap, and starch conversion liquors containing dextrose and dextrose polymers. Throughout this specification and in the appended claims the term hexose will be used to include hexose polymers which yield hexoses on acid hydrolysis.

It is well known that the conversion of hexoses to hydroxymethyl furfural is catalyzed by acids, and acid-generating or acid-reacting compounds. The catalyst employed in processes embodying the improvement comprising the present invention may thus be an inorganic or organic acid such, for example, as hydrochloric acid, sulfuric acid, phosphoric acid, toluene sulfonic acid or acetic acid. Salts of weak bases and strong acids are acid-reacting and effective as catalysts. Aluminum chloride, zinc chloride and chromium chloride may be named as representative of such salts. Furthermore acid-reacting salts may be employed in conjunction with acids as catalysts for the reaction. The improved process of the invention is independent of the particular catalyst selected and is applicable in the presence of any of the foregoing types which will be generically referred to as acid catalysts.

As is well recognized in the art the formation of hydroxymethyl furfural is only one of several competing reactions proceeding when hexoses are subjected to dehydration conditions, others of which include the destruction of formed hydroxymethyl furfural to yield levulinic acid, formic acid, humin and colored bodies of undetermined structure. Accordingly any process for preparing hydroxymethyl furfural by sugar dehydration includes conventional steps for recovering the sought product from the reaction mixture. Liquid-liquid extraction processes and/or distillation may, for example, be employed. Such separation and recovery steps are not part of the present invention but practice of the invention results in reaction product mixtures which are readily adapted to the recovery of high purity hydroxymethyl furfural.

As taught in the prior art of sugar dehydration, it is frequently advisable to interrupt the conversion to hydroxymethyl furfural when only part of the sugar has been dehydrated, thus maximizing the yield of product based on sugar actually consumed. The unreacted sugars after separation of hydroxymethyl furfural may be recycled to the dehydration reactor. The improvement in accordance with the present invention may be employed in such a recycling process if desired.

The before mentioned objects of the invention are accomplished by carrying out the acid catalyzed dehydration step, of an otherwise conventional process for producing hydroxymethyl furfural from a hexose, in the presence of a medium comprising a mixture which contains from 5% to 70% by weight of water and correspondingly from 30% to 95% by weight of an acid-stable aliphatic ketone or an acid-stable aliphatic ether of boiling point no greater than about 280° C. The ether or ketone may be acyclic or cyclic and substituted or unsubstituted as long as any substituent groups do not render the solvent reactive with the acid catalyst or with the hexose carbonyl groups. It is not essential that the ketone or ether be miscible with water or with the sugar solution formed by the hexose and water of the reaction medium. In case immiscibility is encountered vigorous agitation is employed during the dehydration reaction to maintain intimate contact between the components of the reaction medium, the hexose and the acid catalyst. Among the ketones and ethers which may be employed in accordance with the invention are methyl isobutyl ketone, mesityl oxide, dichlorethyl ether, dioxane, glycol monomethyl ether, symmetrical dimethyl dioxane, tetrahydropyran, tetrahydro-2 methyl pyran, and the like. Preferably the ketone or ether is one with a normal boiling point below 140° C. Furthermore it is preferred that the reaction medium contain at least 50% of the organic liquid. A particularly preferred reaction medium is a mixture of dioxane and water containing between 65% and 90% dioxane.

The following examples illustrate how the invention is employed in the conversion of hexoses to hydroxymethyl furfural.

*Example I*

*Conversion.*—A charge consisting of 290 grams p-dioxane and 197.2 grams high test molasses, containing sugar representing 145 grams hexose and 38.6 grams water, together with 0.72 gram aluminum chloride hexahydrate and 0.83 gram hydrochloric acid was reacted in 29 batches in small tantalum bombs. Each charged bomb was shaken in an oil bath at 195° C. for 87 seconds and cooled quickly by immersion in a cold bath. The reacted mixtures were combined for analysis and recovery of the formed hydroxymethyl furfural. The product contained no material insoluble in the reaction medium. By analysis with Fehling's solution after hydrolysis the conversion liquor was found to contain 43.6 grams sugar indicating that 69.9% of the sugar charged had been converted. A portion of the conversion liquor was subjected to a 5-stage countercurrent fractionation between water and butanol to remove interfering substances and the hydroxymethyl furfural determined quantitatively by ultraviolet absorption at 2840 angstroms. The amount found corresponded to 42.3 grams in the entire product, equivalent to 41.7% of the theoretical yield on sugar charged to the reaction and 59.7% on the sugar consumed.

*Recovery.*—In the ensuing description all reported weights of material in process have been corrected for samples removed for analysis and therefore may be referred to the initial charge weight of molasses equivalent to 145.0 grams hexose. The dioxane was removed by distillation under vacuum and the residue (165 grams) taken up in 560 grams of water. 27.5 grams of an adsorbent clay (Super Filtrol) was stirred into the solution, which contained some suspended insoluble humin, at room temperature and filtered to remove insoluble matter. The filter cake was well washed with water, the washings combined with the filtrate, and the whole concentrated, under vacuum to a residue of 166 grams. The residue was partitioned between mesityl oxide and water to separate sugar (aqueous phase) from the bulk of the hydroxymethyl furfural (mesityl oxide phase). The aqueous phase was found by analysis to contain 38.7 grams sugar and 2.6 grams hydroxymethyl furfural and was suitable for recycling to the conversion process.

The mesityl oxide phase was neutralized with 6.5 grams of sodium bicarbonate and extracted with water to remove the formed sodium salts. The mesityl oxide was then taken off under vacuum and the residue diluted with water to a weight of 85.5 grams. By analysis this solution contained 38.6 grams hydroxymethyl furfural. The pH of the solution was adjusted to 7.0 with a small amount of sodium bicarbonate and gradually added to a heated still under vacuum. The distillate weighed 41.8 grams and was found to contain, by analysis, 35.0 grams of hydroxymethyl furfural. Thus 82.8% of the hydroxymethyl furfural in the conversion liquor was recovered in purity of 83.8%. Another 6.1% of the formed hydroxymethyl furfural was available to be recycled with the unconverted sugar and was therefore ultimately recoverable.

Inasmuch as the present invention is concerned only with the conversion step of the hydroxymethyl furfural process, the remaining illustrative examples will not include a description of the process for recovering the final product from the conversion liquor. The method employed in Example I above, or other methods readily devisable from the known properties of hydroxymethyl furfural and related sugar derivatives obtainable as by-products in dehydration reactions, may be applied to the conversion products of any of the examples.

*Example II*

A 400 ml. stainless steel autoclave, equipped with a solenoid-operated plunger for agitation was charged with 80 grams of fructose, 160 grams of dioxane and 25 grams of water. The autoclave was immersed in a heated wax bath and taken to 180° C. under agitation in about 15 minutes, at which time 1.4 ml. of 3.6% hydrochloric acid solution was injected into the charge under nitrogen pressure. After 4 minutes at temperature the autoclave was cooled quickly to terminate the reaction by transferring to a cold ethylene glycol bath. The autoclave was opened and the contents were mixed with those of another run made in the same manner. The mixture of the two runs was subjected to analysis. No insoluble humins were present. The conversion liquor contained unreacted sugar in amount corresponding to 16.3% of that originally charged and hydroxymethyl furfural in amount corresponding to 57.3% of the theoretical yield based on hexose charged to the autoclave. Based on sugar reacted, the yield of hydroxymethyl furfural was 68.5% of theory.

Further illustrating the invention are the following examples, all of which were carried out in sealed glass tube reactors. The general procedure was to charge approximately 1 gram of the named sugar together with the indicated amounts of solvents and catalyst, each expressed as a percentage of the hexose (or hexose equivalent), into a glass tube. The tube was immersed in a bath of molten wax at the indicated temperature, shaken there for the indicated length of time and transferred to a bath of cold ethylene glycol to terminate the reaction. The cooled tube was then opened and the contents analyzed for sugar and hydroxymethyl furfural (HMF) contents from which the yields, percent of theory based on hexose charged and hexose consumed, were calculated.

*Example III*

Hexose source _____ Sorbose (taken as 100%).
Organic liquid _____ Glycol monomethyl ether, 96%.
Water _____ 132%.
Catalyst _____ Sulfuric acid, 1.0%.
Reaction conditions _____ 3 minutes at 180° C.
Sugar remaining _____ 21.6%.
HMF (on sugar charged) __ 52.1% of theory.
HMF (on sugar consumed) _____ 66.4% of theory.

*Example IV*

Hexose source _____ Sorbose (taken as 100%).
Organic liquid _____ Dichlorethyl ether, 99%.
Water _____ 132%.
Catalyst _____ Sulfuric acid, 1%.
Reaction conditions _____ 1.8 minutes at 180° C.
Sugar remaining _____ 20.5%.
HMF (on sugar charged) __ 52.2% of theory.
HMF (on sugar consumed) _____ 65.7% of theory.

*Example V*

Hexose source _____ Sorbose (taken as 100%).
Organic liquid _____ Methyl isobutyl ketone, 96%.
Water _____ 132%.
Catalyst _____ Sulfuric acid, 1%.
Reaction conditions _____ 3.0 minutes at 180° C.
Sugar remaining _____ 18.5%.
HMF (on sugar charged) __ 52.5% of theory.
HMF (on sugar consumed) _ 64.4% of theory.

*Example VI*

Hexose source _____ Sorbose (taken as 100%).
Organic liquid _____ Mesityl oxide, 152%.
Water _____ 80%.
Catalyst _____ Hydrochloric acid, 0.25%.
Reaction conditions _____ 2.0 minutes at 180° C.
Sugar remaining _____ 25.5%.
HMF (on sugar charged) __ 56.4% of theory.
HMF (on sugar consumed) _ 75.7% of theory.

*Example VII*

Hexose source _____ Glucose (taken as 100%).
Organic liquid _____ Dioxane, 208%.
Water _____ 34%.
Catalyst _____ $AlCl_3 \cdot 6H_2O$, 0.22%.
Reaction conditions _____ 3 minutes at 210° C.
Sugar remaining _____ 20.8%.
HMF (on sugar charged) __ 41.6% of theory.
HMF (on sugar consumed) _ 52.5% of theory.

Example VIII

Hexose source _____ Glucose (taken as 100%).
Organic liquid _____ Sym. dimethyl dioxane, 159%.
Water _____ 82%.
Catalyst _____ $AlCl_3 \cdot 6H_2O$–0.22%; HCl, 0.12%.
Reaction conditions _____ 2.5 minutes at 210° C.
Sugar remaining _____ 21.1%.
HMF (on sugar charged) _____ 40.9% of theory.
HMF (on sugar consumed) _____ 51.8% of theory.

Example IX

Hexose source _____ Sucrose (hexose equiv. taken as 100%).
Organic liquid _____ Dioxane, 195%.
Water _____ 35%.
Catalyst _____ $CrCl_3 \cdot 6H_2O$, 0.24%; HCl, 0.12%.
Reaction conditions _____ 4 minutes at 210° C.
Sugar remaining _____ 17.4%.
HMF (on sugar charged) _____ 46.8% of theory.
HMF (on sugar consumed) _____ 56.6% of theory.

Example X

Hexose source _____ Sucrose (hexose equiv. taken as 100%).
Organic liquid _____ Tetrahydro-2-methyl furan, 164%.
Water _____ 80%.
Catalyst _____ $AlCl_3 \cdot 6H_2O$, 0.22%; HCl, 0.12%.
Reaction conditions _____ 2.0 minutes at 210° C.
Sugar remaining _____ 18.5%.
HMF (on sugar charged) _____ 43.8% of theory.
HMF (on sugar consumed) _____ 53.7% of theory.

Example XI

Hexose source _____ Mixed[1] (hexose equiv. taken as 100%).
Organic liquid _____ Dioxane, 131%.
Water _____ 36%.
Catalyst _____ $AlCl_3 \cdot 6H_2O$, 0.45%; HCl, 0.50%.
Reaction conditions _____ 1.8 minutes at 210° C.
Sugar remaining _____ 20.8%.
HMF (on sugar charged) _____ 51.0% of theory.
HMF (on sugar consumed) _____ 64.4% of theory.

[1] High test molasses plus sugar recovered from a prior high test molasses conversion. The recovered sugar represented 30% of the total.

Example XII

Hexose source _____ Sucrose (hexose equiv. taken as 100%).
Organic liquid _____ Dioxane, 152%.
Water _____ 78%.
Catalyst _____ $AlCl_3 \cdot 6H_2O$, 1.35%; HCl, 0.18%.
Reaction conditions _____ 23 minutes at 150° C.
Sugar remaining _____ 27.1%.
HMF (on sugar charged) _____ 40.2% of theory.
HMF (on sugar consumed) _____ 55.2% of theory.

Example XIII

Hexose source _____ Sorbose (taken as 100%).
Organic liquid _____ Triethylene glycol, 201%.
Water _____ 36%.
Catalyst _____ HCl, 0.13%.
Reaction conditions _____ 3 minutes at 180° C.
Sugar remaining _____ 16.4%.
HMF (on sugar charged) _____ 66.9% of theory.
HMF (on sugar consumed) _____ 80.0% of theory.

It is to be emphasized that the improvement in conversion of hexoes to hydroxymethyl furfural in accordance with the invention is effected by virtue of the composition of the reaction medium. The absolute values of extent of conversion and yield of hydroxymethyl furfural will vary with the choice of sugar, catalyst, and reaction conditions but by employing the water-organic liquid reaction medium as above-defined and illustrated in place of prior art reaction media such, for example, as water or aqueous alcohol mixtures, the improved results will be obtained.

In general, when employing the reaction media of the invention it is possible to work with higher sugar concentrations than was considered desirable in the prior art with concomitant savings in processing costs. A preferred range of sugar concentrations in the interest of maximum yield of hydroxymethyl furfural and avoidance of undue dilution is from 25% to 40% by weight of the total conversion liquor. At concentrations higher than 50% there is a marked decrease in hydroxymethyl furfural yield for any given sugar consumption and it is preferred to avoid such high concentrations.

Choice of catalyst, amount of catalyst, nature of the sugar, reaction temperature and reaction time all interact in determining the amount of sugar reacted in a conversion cycle. At temperature below about 150° C. conversion is unduly slow and it is therefore considered advisable to work above that temperature. At temperatures above about 220° C. thermal degradation other than the desired dehydration increases markedly and such temperatures should be avoided. A preferred, though not highly critical, range is from 180° C. to 210° C. In general, the ketoses may be economically converted at somewhat lower temperatures than the aldoses or hydrolyzable disaccharides.

As has been noted by prior investigators, as the amount of sugar converted in a single cycle increases, the yield of hydroxymethyl furfural based on sugar consumed decreases. The choice of extent of conversion per pass thus involves a balancing of the cost of recovering and recycling larger amount of unreacted sugar against the cost of letting more of the sugar go to unwanted by-products instead of to hydroxymethyl furfural. Employing a reaction medium as disclosed and claimed in the present invention permits carrying the conversion further before the hydroxymethyl furfural yield drops to an uneconomically low value than when employing the aforesaid prior art reaction media.

Adjustment of the several reacting conditions to the optimum value when employing the principle of the invention is well within the skill of the chemical art having regard to the foregoing description and illustrative examples.

What is claimed is:

1. In the process of preparing hydroxymethyl furfural by the acid catalyzed dehydration of a hexose at elevated temperature the improvement which comprises carrying out the said acid catalyzed dehydration step in the presence of a reaction medium consisting essentially of from 50% to 90% by weight of dioxane and correspondingly from 10% to 50% by weight of water in the temperature range of 150° C. to 220° C., the concentration of hexose in the reaction charge lying between the inclusive limits of 25% and 50%.

2. The process of claim 1 wherein the hexose is a ketose.

3. The process of claim 2 wherein the catalyst is a mineral acid.

4. The process of claim 1 wherein the hexose is hydrolyzed sucrose.

5. The process of claim 4 wherein the catalyst is a mixture of hydrochloric acid and aluminum chloride.

6. In the process of preparing hydroxymethyl furfural by the acid catalyzed dehydration of a hexose at elevated temperature the improvement which comprises carrying out the dehydration in a reaction medium comprising a mixture which contains from 5% to 70% by weight of water and correspondingly from 30% to 95% by weight of an organic liquid selected from the group consisting of dioxane, mesityl oxide, glycol monomethyl ether, dichlorethyl ether, methyl isobutyl ketone, dimethyl dioxane, tetrahydromethyl furan and triethylene glycol.

7. The improved process of claim 6 wherein the said organic liquid is dioxane.

8. The improved process of claim 6 wherein the said organic liquid is mesityl oxide.

References Cited in the file of this patent

UNITED STATES PATENTS

| | | |
|---|---|---|
| 2,498,918 | Haworth | Feb. 28, 1950 |
| 2,750,394 | Penniston | June 16, 1956 |

OTHER REFERENCES

Dunlop: "The Furans," page 410, Reinhold Publishing Corp. (1953).

Fieser: "Organic Chemistry," (Third Edition, 1956), page 133.

Weissberger: Technique of Organic Chemistry, vol. III, pt. 1 (1956), page 302.